United States Patent
Murakami et al.

(10) Patent No.: US 9,491,477 B2
(45) Date of Patent: Nov. 8, 2016

(54) IMAGE DECODING METHOD AND IMAGE DECODING APPARATUS

(75) Inventors: Tomokazu Murakami, Tokyo (JP); Toru Yokoyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 266 days.

(21) Appl. No.: 14/381,663

(22) PCT Filed: Mar. 30, 2012

(86) PCT No.: PCT/JP2012/002222
§ 371 (c)(1),
(2), (4) Date: Nov. 18, 2014

(87) PCT Pub. No.: WO2013/145021
PCT Pub. Date: Oct. 3, 2013

(65) Prior Publication Data
US 2015/0063437 A1  Mar. 5, 2015

(51) Int. Cl.
*H04N 11/02* (2006.01)
*H04N 19/30* (2014.01)
*H04N 19/50* (2014.01)
*H04N 19/176* (2014.01)
*H04N 19/119* (2014.01)
*H04N 19/196* (2014.01)
*H04N 19/157* (2014.01)
*H04N 19/187* (2014.01)
*H04N 19/33* (2014.01)
*H04N 19/169* (2014.01)
*H04N 19/61* (2014.01)

(52) U.S. Cl.
CPC ............ *H04N 19/30* (2014.11); *H04N 19/119* (2014.11); *H04N 19/157* (2014.11); *H04N 19/169* (2014.11); *H04N 19/176* (2014.11); *H04N 19/187* (2014.11); *H04N 19/196* (2014.11); *H04N 19/33* (2014.11); *H04N 19/50* (2014.11); *H04N 19/61* (2014.11)

(58) Field of Classification Search
USPC ...................................... 375/240.01–240.29
See application file for complete search history.

(56) References Cited

U.S. PATENT DOCUMENTS

| | | | |
|---|---|---|---|
| 8,270,486 B2* | 9/2012 | Song | H04N 19/105 375/240.12 |
| 8,792,547 B2* | 7/2014 | Min | H04N 19/105 375/240 |
| 2013/0188719 A1* | 7/2013 | Chen | H04N 19/00684 375/240.16 |
| 2013/0343455 A1* | 12/2013 | Yamamoto | H04N 19/00533 375/240.03 |

OTHER PUBLICATIONS

Thomas Wiegand, "WD3: Working Draft 3 of High-Efficiency Video Coding", Joint Collaborative Team on Video Coding (JCT-VC) of ITU-T SG16 WP3 and ISO/IEC JTC1/SC29/WG11, 5th Meeting: Geneva, CH, Mar. 16-23, 2011.

* cited by examiner

*Primary Examiner* — Leron Beck
(74) *Attorney, Agent, or Firm* — Baker Botts L.L.P.

(57) ABSTRACT

To provide a video coding technique to reduce the amount of code, a coding apparatus configured to code layers at a plurality of resolutions as a stream determines the coding unit, prediction unit, and frequency transform unit for each layer in compliance with given rules with reference to the coding unit, prediction unit, and frequency transform unit of the lower layer, respectively, and switches the given rules with a flag. This adaptively and efficiently compresses a video.

10 Claims, 8 Drawing Sheets

FIG. 3
BASE LAYER
301
CU HAS TREE STRUCTURE.
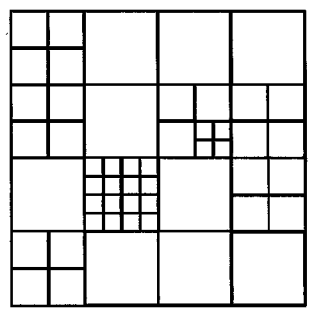
ENHANCEMENT LAYER (EXAMPLE 1)
302
CUs ARE DOUBLED RESPECTIVELY.
MAXIMUM SIZE IS APPLIED
TO PLACE OF WHICH SIZE
EXCEEDS MAXIMUM UNIT SIZE.
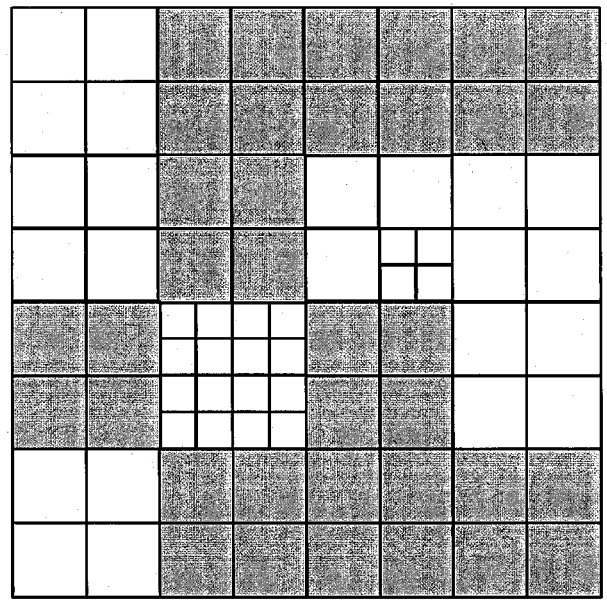
ENHANCEMENT LAYER (EXAMPLE 2)
303
CU SIZE IS NOT CHANGED.
NUMBER OF CUs IS
INCREASED TO FILL LAYER.
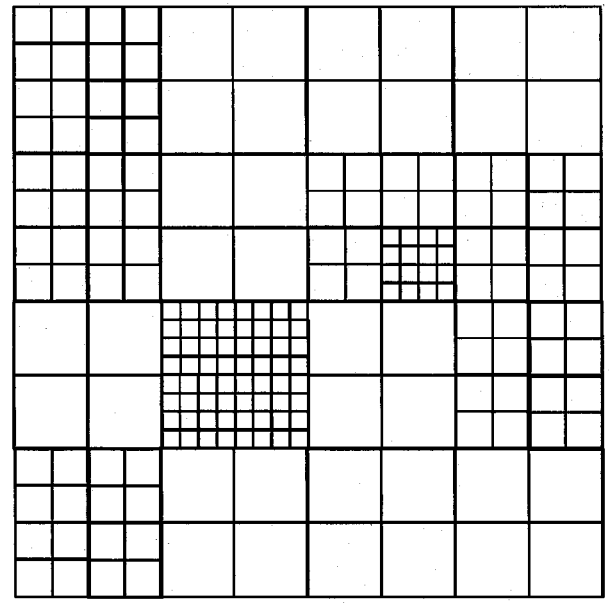

FIG. 4
BASE LAYER
401
BASE LAYER IS DIVIDED USING
MACROBLOCK AND PREDICTION MODE
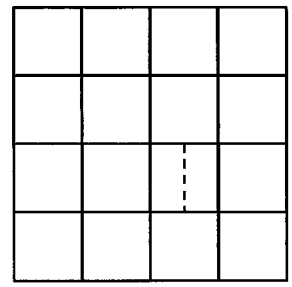
ENHANCEMENT LAYER (EXAMPLE 1)
402
MACROBLOCK SIZE IS DOUBLED
AND SET AS CU.
SIZE IN PREDICTION MODE IS
DOUBLED AND SET AS PU.
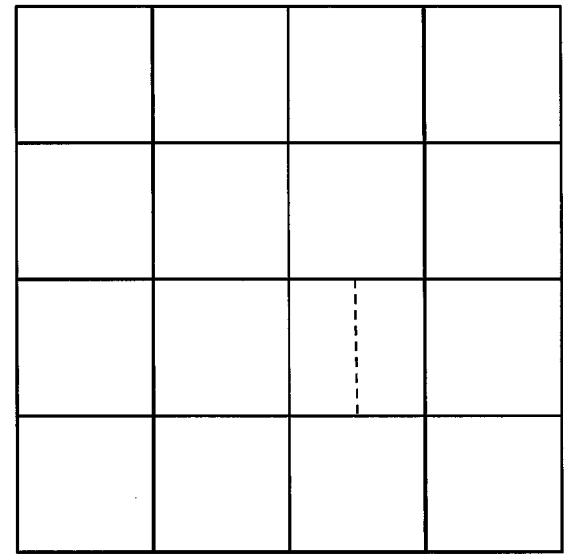
ENHANCEMENT LAYER (EXAMPLE 2)
403
CU HAS SAME SIZE AS
MACROBLOCK SIZE.
PU SIZE IS ADJUSTED TO CU SIZE.
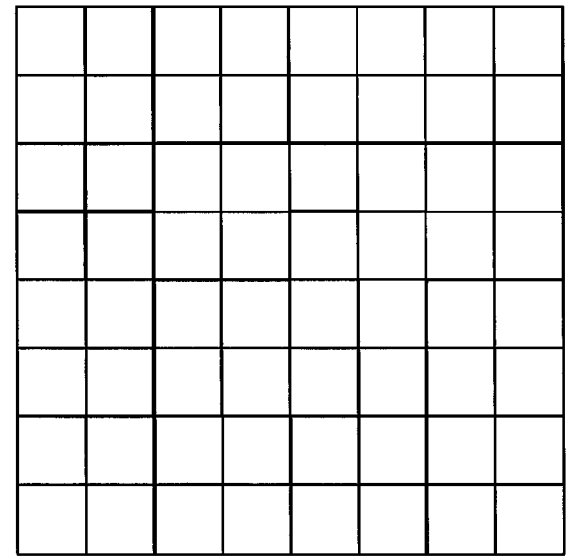

IMAGE DECODING METHOD AND IMAGE DECODING APPARATUS

TECHNICAL FIELD

The present invention relates to an image coding method and image coding apparatus for coding an image, an image decoding method and image decoding apparatus for decoding coded image data, and the coded image data.

BACKGROUND ART

Video coding standards include H.264/AVC (Advanced Video Coding). ISO/IEC MPEG and ITU-T VCEG have established Joint Collaborative Team on Video Coding (JCT-VC) to achieve a compression ratio exceeding that of H.264/AVC and have started discussing a next-generation system referred to as High Efficiency Video Coding (HEVC).

There are various types of terminals that decode and play coded video, for example, a terminal capable of playing video at a high resolution or a terminal capable of playing video only at a low resolution. Thus, there is a need for a scalability extension coding system capable of playing video at a plurality of resolutions as necessary by partially extracting data from a coded stream. Scalable Video Coding (SVC) is standardized as scalability extension in H.264/AVC.

In conventional video coding standards including H.264/AVC, SVC, and MPEG-2, the macroblock that is a unit for coding has a fixed size.

For HEVC that is in the process of design, making the block size that has been fixed in and before H264/AVC variable is under consideration. Specifically, the block size of a unit CU (Coding Unit) with which the coding is performed is managed using a tree structure such that the number of pixels on a side of the block is a power of two. Coding or decoding is performed using the block size of an arbitrary layer (see NPL 1).

CITATION LIST

Patent Literature

NPL 1: Doc. JCTVC-E603, Joint Collaborative Team on Video Coding (JCT-VC), March 2011, T. Wiegand, W. Han, B. Bross, J. Ohm and G. Sullivan, Working Draft 3 of High-Efficiency Video Coding, "7.3.6 Coding unit syntax" at pages 39 to 40, "7.4.6 Coding unit semantics" at pages 63 to 64.

SUMMARY OF INVENTION

Technical Problem

There are video coding systems. In some of them, the unit for coding has a fixed size. In the others, the size varies depending on the position in the image. How to perform scalability extension in the video coding systems including the systems using different sizes has not been discussed. Thus, efficient compression cannot be performed.

The description methods not only for CU but also for PU (Prediction Unit) that is a prediction unit, and TU (Transform Unit) that is a frequency transform unit have not been discussed. Thus, there is a problem in that efficient compression cannot be performed.

Furthermore, the description method for a system in which the macroblock of the base layer has a fixed size as in H.264/AVC or MPEG-2 and the CU of the enhancement layer has a different size as in HEVC has not been discussed. Thus, there is a problem in that efficient compression cannot be performed.

As described above, an objective of the present invention is to provide an image coding technology and image decoding technology having a high coding efficiency in consideration of the scalability extension by defining the correspondence relationship between the layers in a coding system including coding units having different sizes.

Solution to Problem

The present application includes various methods for solving the aforementioned problems. One of them is cited as follows.

An image decoding method for decoding a coded stream obtained by coding a video and capable of decoding images at a plurality of resolutions by extracting a part of the coded stream, the method including: decoding a division method of a unit CU for coding each layer; decoding a division method of a prediction unit PU; and decoding a division method of a frequency transform unit TU, wherein, in the decoding of CU of a layer 1, the CU division method is calculated with reference to a CU division method of another layer 0 and in compliance with a given rule, in the decoding of PU of a layer 1, the PU division method is calculated with reference to a CU division method of the same layer 1 and a PU division method of another layer 0, and in compliance with a given rule, in the decoding of TU of a layer 1, the TU division method is calculated with reference to a CU division method of the same layer 1 and a TU division method of another layer 0, and in compliance with a given rule, and the given rule is determined with a flag.

Advantageous Effects of Invention

According to the invention, the coding efficiency of a coding system having a scalability extension function can be improved.

BRIEF DESCRIPTION OF DRAWINGS

FIG. 3 is an explanatory diagram of a coding unit according to the embodiment 1.
FIG. 4 is an explanatory diagram of a coding unit according to the embodiment 1.

DESCRIPTION OF EMBODIMENTS

Hereinafter, the embodiment will be described with reference to the appended drawings.

In each of the drawings, the components to which the same reference signs are put have the same function.

In each of the descriptions and each of the drawings herein, the "macroblock" indicates a coding unit with a fixed size in a conventional coding system. The "CU" indicates a Coding Unit that is a coding unit of which size can be selected from a plurality of sizes. The "PU" indicates a Prediction Unit that is a prediction unit of which size can be selected from a plurality of sizes. The "TU" indicates a Transform Unit that is a frequency transform unit of which size can be selected from a plurality of sizes.

In each of the descriptions and each of the drawings herein, the expression "transmitted with a flag" includes the meaning "transmitted while being included in a flag".

In each of the descriptions and each of the drawings herein, the expression "coding mode" includes a combination of a classification of intra prediction/inter prediction and the block size to be applied.

In each of the descriptions and each of the drawings herein, the expression "prediction mode information" means the information including the division methods of (CU and PU) or MB, and the coding mode(s). If MB is included, the expression further means the information including the prediction block size in the macroblock.

In each of the descriptions and each of the drawings herein, the expression "transform mode information" means the information including the division methods of (CU and TU) or MB, and the coding mode(s).

In each of the descriptions and each of the drawings herein, the expression "unit information" means the information including the division methods of (CU, PU and TU) or MB, and the coding mode(s). If MB is included, the expression further means the information including the prediction block size in the macroblock.

In each of the descriptions and each of the drawings herein, the expression "scalability extension" is described as an expression meaning a system in which an upper layer of which resolution is extended is added to the lower layer that can independently be decoded. However, the expression can be applied to SNR scalability extension in which the data of an upper layer of which resolution is not changed and of which SN ratio is improved is added to the lower layer, or frame rate scalability extension in which an upper layer in which the number of frames is increased is added to the lower layer. The expression includes the meanings.

Embodiment 1

Figure 1:
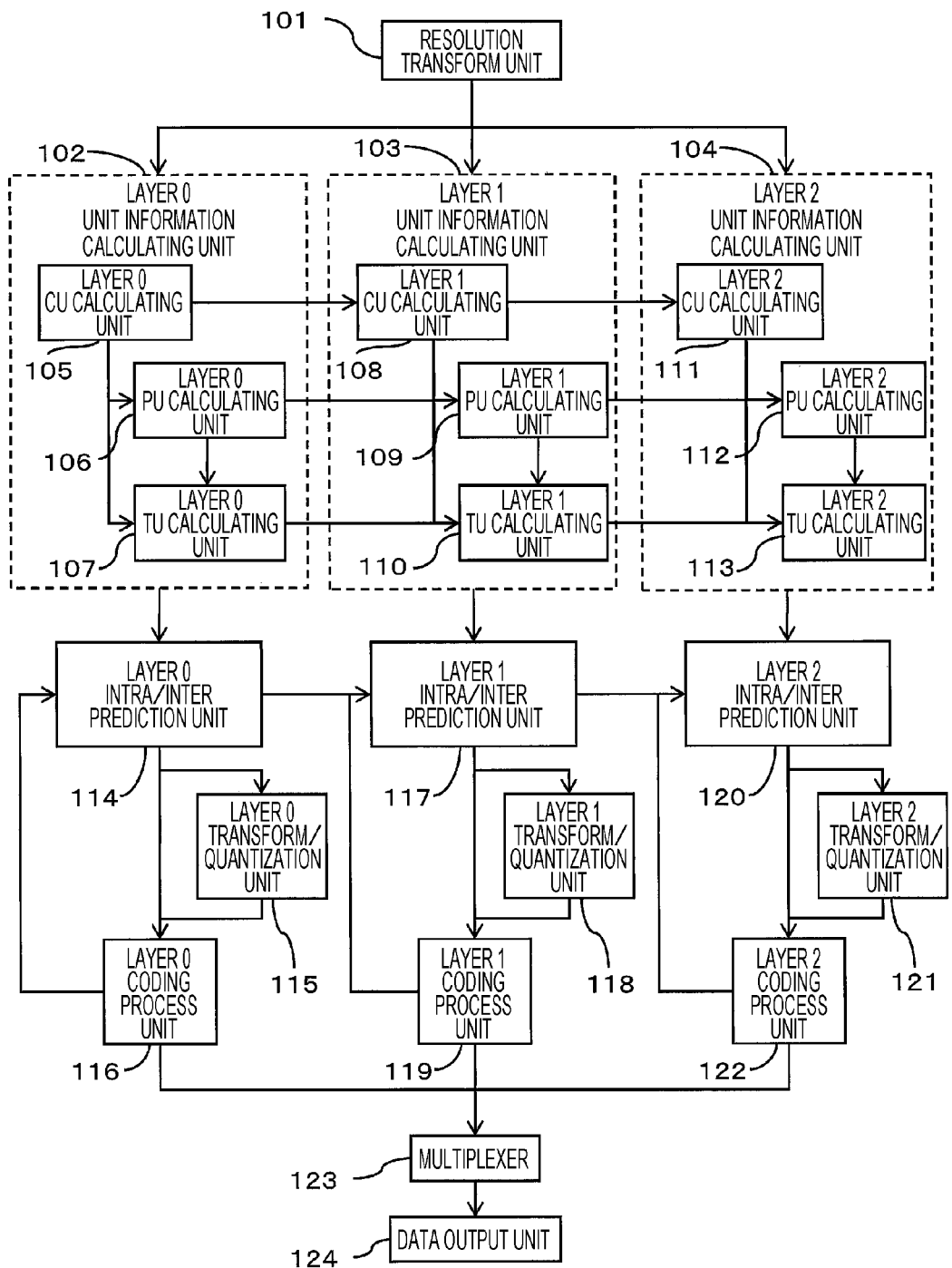
FIG. 1 is a block diagram of an image coding apparatus according to an embodiment 1.

First, the embodiment 1 will be described with reference to the appended drawings. FIG. 1 is a block diagram of an image coding apparatus according to the embodiment 1. Hereinafter, an example in which input video can be coded at three different resolutions. A layer 0, a layer 1, and a layer 2 exist in ascending order of resolution. The layer lower than the other is referred to as a lower layer, and the layer higher than the other is referred to as an upper layer. The layer 0 that is the bottom layer with the lowest resolution is referred to as a base layer. The other layers are referred to as an enhancement layer.

The image coding apparatus includes a resolution transform unit 101, a layer 0 unit information calculating unit 102, a layer 1 unit information calculating unit 103, a layer 2 unit information calculating unit 104, a layer 0 CU calculating unit 105, a layer 0 PU calculating unit 106, a layer 0 TU calculating unit 107, a layer 1 CU calculating unit 108, a layer 1 PU calculating unit 109, a layer 1 TU calculating unit 110, a layer 2 CU calculating unit 111, a layer 2 PU calculating unit 112, a layer 2 TU calculating unit 113, a layer 0 intra/inter prediction unit 114, a layer 0 transform/ quantization unit 115, a layer 0 coding process unit 116, a layer 1 intra/inter prediction unit 117, a layer 1 transform/ quantization unit 118, a layer 1 coding process unit 119, a layer 2 intra/inter prediction unit 120, a layer 2 transform/ quantization unit 121, a layer 2 coding process unit 122, a multiplexer 123, and a data output unit 124.

Hereinafter, the operation of each of the components in the image coding apparatus will be described in detail.

Note that the operation of each of the components in the image coding apparatus can be, for example, an autonomous operation of each of the components as described below. Alternatively, the operation can be implemented by the cooperation of the control unit of the computer and the software stored in the storage unit of the computer.

First, the resolution transform unit 101 transforms the input video at a plurality of resolutions and transfers the images as different layers to the unit information calculating units for each layer. For example, when the coding is performed using three resolutions, the layer at the same resolution as the input video is the layer 2. The layer transformed at the resolution that divides the layer in half vertically and horizontally is the layer 1. The layer transformed at the resolution that divides the layer in one-quarter vertically and horizontally is the layer 0, and the layer 0 can be the base layer. The resolution-based transform can use a general sampling filter.

Next, a coding method for each layer will be described.

First, the layer 0 that is the base layer is coded. The coding system for the base layer includes a system such as HEVC in which the layer is coded using CU of which size can be selected from a plurality of sizes, and a system such as H.264/AVC or MPEG-2 in which the layer is coded using a macroblock that is a coding unit with a fixed size. Hereinafter, the case in which CU is used is referred as a "CU case" and the case in which the macroblock is used is referred as an "MB case".

The layer 0 unit information calculating unit 102 determines whether the case is a "CU case" or an "MB case" and outputs the image of the layer 0 and the "unit information".

The "unit information" in the "CU case" is three division methods: a division method of CU; a division method of PU; and a division method of TU, and the coding modes. The "unit information" in the "MB case" is the prediction block size in the macroblock and the coding mode.

The layer 0 CU calculating unit 105 determines the division method of CU for the layer 0. In CU, the division method is determined after the optimization for increasing the coding efficiency in whole the video, similarly to a conventional system. In MB, the layer is divided in a unit with a fixed size.

The layer 0 PU calculating unit 106 determines the division method of PU for the layer 0. In CU, the division of PU is performed with reference to the result from the division of CU. In CU, the division method and the prediction mode are determined after the optimization for increasing the coding efficiency in whole the video. In the MB case, the prediction block size in the macroblock and the prediction mode is similarly determined after the optimization for increasing the coding efficiency in whole the video.

The layer 0 TU calculating unit 107 determines the division method of TU for the layer 0. The division of TU is performed with reference to the result from the division of CU. In CU, the division method and the transform system are determined after the optimization for increasing the coding efficiency in whole the video. In the MB case, a transform system in a unit with a fixed size is used.

As described above, the layer 0 unit information calculating unit 102 transmits the image at the resolution of the layer 0 and the unit information to the layer 0 intra/inter prediction unit 114 while transmitting the determination result to the same calculating unit for the layer 1. At the time, the unit information is transformed into a predetermined flag.

Next, the image at the resolution of the layer 0 is coded based on the unit information about the layer 0.

The layer 0 intra/inter prediction unit 114 performs an intra prediction or an inter prediction according to the CU division method, the PU division method, and the prediction modes in the unit information. Existing techniques are used as the prediction modes. The prediction mode information is transmitted to the layer 0 coding process unit 116. The residual elements after the prediction, and the CU division method and TU division method in the unit information are transmitted to the layer 0 transform/quantization unit 115.

The layer 0 transform/quantization unit 115 performs a frequency transform and a quantization according to the CU division method and TU division method in the unit information. Existing techniques are used as the processing methods. The coefficient information after the quantization is transmitted to the layer 0 coding process unit 116.

The layer 0 coding process unit 116 performs an entropy coding of the prediction mode information and the coefficient information and outputs the coded data to the multiplexer 123.

The layer 0 coding process unit 116 further performs an inverse quantization and an inverse frequency transform as necessary to restore the reference image data and transmit the data to the layer 0 intra/inter prediction unit 114. Existing techniques are used as the processing methods.

Following the coding of the layer 0, the layer 1 at the next upper resolution is coded.

The layer 1 unit information calculating unit 103 determines the three division methods: a division method of CU; division method of PU; division method of TU for the layer 1 and the coding modes. The enhancement layers that are the layer 1 and the higher layers are coded using CU having a different size of the coding unit as in HEVC.

The layer 1 CU calculating unit 108 determines the division method of CU for the layer 1. At that time, the layer 1 CU calculating unit 108 determines the CU division method in compliance with a given rule with reference to the CU division method from the CU calculating unit 105 for the layer 0 that is the next lower layer. The Cu division can be performed independently from the layer 0. In such a case, the division is performed basically in compliance with the rule and performed partially differently from the rule by exceptionally inserting a flag. The division method is determined after the optimization for increasing the coding efficiency in whole the video. The rule for the CU division method with reference to the lower layer will be described below.

The layer 1 PU calculating unit 109 determines the division method of PU and prediction mode for the layer 1. The division of PU is performed with reference to the result from the division of CU of the layer 1 and the result from the division of PU of the layer 0. However, even in the method with reference to only one of the result from the division of CU of the layer 1 and the PU division method of the layer 0, the division method can be determined in compliance with a rule independent from the results. The division is performed basically in compliance with the rule and performed partially differently from the rule by inserting a flag. The division method and prediction mode are determined after the optimization for increasing the coding efficiency in whole the video. The rule for the division method will be described below.

The layer 1 TU calculating unit 110 determines the division method and transform method of TU for the layer 1. The division of TU is performed with reference to the result from the division of CU of the layer 1 and the result from the division of TU of the layer 0. However, even in the method with reference to only one of the result from the division of CU of the layer 1 and the TU division method of the layer 0, the division method can be determined in compliance with a rule independent from the results. In such a case, the division is performed basically in compliance with the rule and performed partially differently from the rule by inserting a flag. The division method and transform method are determined after the optimization for increasing the coding efficiency in whole the video. The rule for the division method will be described below.

As described above, the layer 1 unit information calculating unit 103 transmits the image at the resolution of the layer 1 and the unit information to the layer 1 intra/inter prediction unit 117 while transmitting the determination result to the same calculating unit for the layer 2. At the time, the unit information is transformed into a predetermined flag.

Next, the layer 1 is coded based on the unit information about the layer 1.

The layer 1 intra/inter prediction unit 117 performs an intra prediction or an inter prediction according to the CU division method, the PU division method, and the prediction modes in the unit information. At that time, the layer 1 intra/inter prediction unit 117 refers also to the decoded image of the layer 0 that is the lower layer and the prediction mode of the place that is at the same position after the adjustment by the resolution-based transform using a layer-to-layer prediction. Existing techniques are used as the prediction methods. The prediction mode information is transmitted to the layer 1 coding process unit 119. The residual elements after the prediction, and the CU division method and TU division method in the unit information are transmitted to the layer 1 transform/quantization unit 118.

The layer 1 transform/quantization unit 118 performs a frequency transform and a quantization according to the CU division method and TU division method in the unit information. Existing techniques are used as the processing methods. The coefficient information after the quantization is transmitted to the layer 1 coding process unit 119.

The layer 1 coding process unit 119 performs an entropy coding of the prediction mode information and the coefficient information and outputs the coded data to the multiplexer 123.

The layer 1 coding process unit 119 further performs an inverse quantization and an inverse frequency transform as necessary to restore the reference image data and transmit the data to the layer 1 intra/inter prediction unit 117. Existing techniques are used as the processing methods.

Following the coding of the layer 1, the layer 2 at the next upper resolution is coded.

The layer 2 unit information calculating unit 104 determines the three division method coding modes: a division method of CU; division method of PU; division method of TU for the layer 2. The enhancement layers that are the layer 1 and the higher layers are coded using CU having a different size of the coding unit as in HEVC.

The layer 2 CU calculating unit 111 determines the division method of CU for the layer 2. At that time, the layer 1 CU calculating unit 108 determines the CU division method in compliance with a given rule with reference to the CU division method from the CU calculating unit 108 for the layer 1 that is the next lower layer. The Cu division can be performed independently from the layer 1. In such a case, the division is performed basically in compliance with the rule and performed partially differently from the rule by exceptionally inserting a flag. The division method is determined after the optimization for increasing the coding efficiency in whole the video. The rule for the CU division method with reference to the lower layer will be described below.

The layer 2 PU calculating unit 112 determines the division method and prediction mode of PU for the layer 2. The division of PU is performed with reference to the result from the division of CU of the layer 2 and the result from the division of PU of the layer 1. However, even in the method with reference to only one of the result from the division of CU of the layer 1 and the PU division method of the layer 0, the division method can be determined in compliance with a rule independent from the results. In such a case, the division is performed basically in compliance with the rule and performed partially differently from the rule by inserting a flag. The division method and prediction mode are determined after the optimization for increasing the coding efficiency in whole the video. The rule for the division method will be described below.

The layer 2 TU calculating unit 113 determines the division method and transform method of TU for the layer 2. The division of TU is performed with reference to the result from the division of CU of the layer 2 and the result from the division of TU of the layer 1. However, even in the method with reference to only one of the result from the division of CU of the layer 1 and the TU division method of the layer 0, the division method can be determined in compliance with a rule independent from the results. The division is performed basically in compliance with the rule and performed partially differently from the rule by inserting a flag. The division method and transform method are determined after the optimization for increasing the coding efficiency in whole the video. The rule for the division method will be described below.

As described above, the layer 2 unit information calculating unit ill transmits the image at the resolution for the layer 2 and the unit information to the layer 2 intra/inter prediction unit 120. At the time, the unit information is transformed into a predetermined flag.

Next, the layer 2 is coded based on the unit information about the layer 2.

The layer 2 intra/inter prediction unit 120 performs an intra prediction or an inter prediction according to the CU division method, the PU division method, and the prediction modes in the unit information. At that time, the layer 2 intra/inter prediction unit 120 refers to the decoded video of the layer 1 that is the lower layer and the prediction mode of the place that is at the same position after the adjustment by the resolution transform using a layer-to-layer prediction. Existing techniques can be used as the prediction methods. The coding mode information is transmitted to the layer 2 coding process unit 122. The residual elements after the prediction, and the CU division method and TU division method in the unit information are transmitted to the layer 2 transform/quantization unit 121.

The layer 2 transform/quantization unit 121 performs a frequency transform and a quantization according to the CU division method and TU division method in the unit information. Existing techniques are used as the processing methods. The coefficient information after the quantization is transmitted to the layer 2 coding process unit 122.

The layer 2 coding process unit 122 performs an entropy coding of the prediction mode information and the coefficient information and outputs the coded data to the multiplexer 123. The layer 2 coding process unit 122 further performs an inverse quantization and an inverse frequency transform as necessary to restore the reference image data and transmit the data to the layer 2 intra/inter prediction unit 120. Existing techniques are used as the processing methods.

The multiplexer 123 multiplexes the coded data of the layer 0, the layer 1, the layer 2 into a stream. Existing techniques can be used as the method for packetizing the data, the method for setting the index and flag, and the multiplexing method. At last, the data output unit 124 outputs the multiplexed stream data.

The rule for calculating the division methods of CU, PU, and TU of the upper layer according to the division methods of CU, PU, and TU of the lower layer will be described using FIG. 3. Hereinbelow, the description will be made taking CU as an example.

It is assumed that CU of the base layer is divided as 301. It is also assumed that the division method is managed and recorded in a tree shape using a quad tree. In that case, to write the division method for the enhancement layer of which resolution is doubled vertically and horizontally, a rule for the division method such as 302 is established. Then, the rule can be designated with a flag or the like. In the division method of 302, CU of the base layer is enlarged according to the resolution ratio and, if there is a place of which enlarged CU size exceeds the maximum size of CU, the maximum size is applied to the place. This can divide the enhancement layer according to the division method of the base layer without separately transmitting the CU division information. The information about the divided CU can be managed in a tree structure using a quad tree or the like.

Next, as another example, the rule under which the enhancement layer is divided as 303 will be described. In the division method of 303, the same CU size as the base layer is used at each position on the enhancement layer according to the resolution ratio with reference to CU of the base layer. Thus, the number of CUs of the enhancement layer is larger than that of the base layer. This method can also divide the enhancement layer according to the division method of the base layer without separately transmitting the CU division information. The information about the divided CU can be managed in a tree structure using a quad tree or the like.

Next, the rule for calculating the division method of the enhancement layer when the base layer is coded using the macroblock with a fixed size and the prediction mode as in H.264/AVC or MPEG-2, and the "CU" and "PU" of which sizes can be selected from a plurality of sizes as in HEVC are used for the enhancement layer will be described using FIG. 4.

It is assumed that the base layer is coded using the macroblock with a fixed size as 401 and the unit of prediction is prescribed according to the prediction mode of each macroblock. In that case, to write the division method for the enhancement layer of which resolution is doubled vertically and horizontally, a rule for the division method such as 402 is established. Then, the rule can be designated with a flag or the like. In the division method of 402, the macroblock of the base layer is enlarged according to the resolution ratio and is set as CU. If there is a place of which enlarged macroblock size exceeds the maximum size of CU, the maximum size is applied to the place. When PU is used, the size designated by the prediction mode can be enlarged according to the resolution ratio and is set as PU. This can divide the enhancement layer according to the division method of the base layer without separately transmitting the CU or PU division information. The information about the divided CU can be managed in a tree structure using a quad tree or the like.

Next, as another example, the rule under which the enhancement layer is divided as 403 will be described. In the division method of 403, the same CU size as the macroblock of the base layer is used at each position on the enhancement layer according to the resolution ratio with reference to the macroblock of the base layer. If PU is used, the same size as the size designated by the prediction mode of the base layer can be used as the size of PU, or the size can be adjusted to the CU size of the enhancement layer. This method can also divide the enhancement layer according to the division method of the base layer without separately transmitting the CU or PU division information. The information about the divided CU can be managed in a tree structure using a quad tree or the like.

When the enhancement layer is divided with reference to the unit of the base layer, the information about the unit at the same position can be referred to according to the resolution ratio. The case of CU has been described above as an example. However, the same rule can be applied to PU or TU. In the example, all of the divided units have a square shape. However, the unit can be divided into a shape other than a square shape such as a rectangular shape by merging each unit and a neighboring unit in a method such as PU_MERGE. The description above is the basic rule. However, another division method can partially be applied by inserting a flag or the like.

Alternatively, the sizes that are available in CU, PU, or TU are designated on the enhancement layer and the base layer in advance, and then the sizes can be switched with a flag. Not only the sizes but also the coding modes that are available on each of the layers are designated, and then the coding modes can be switched with a flag. For example, the efficient coding mode and CU, PU, or TU size for a video at a low resolution are sometimes different from those for a video at a high resolution. Thus, determining the numbers and patterns of the coding modes and sizes in advance according to the resolution can implement efficient coding.

The rules for CU, PU, and TU can be different from each other or can be the same. It can be determined with a flag whether the rules are standardized or are separated.

The division method to be applied or the rules can be switched depending on the picture type of each layer to be coded, for example, an I picture, a P picture, or a B picture.

The scalability extension described above can be applied to the coding of a multiple view image. In such a case, the layers to be extended are placed two-dimensionally in a direction of resolution and in a direction of view. Thus, in the application to a multiple view image, different division methods and rules can be applied to the direction of resolution and the direction of view, respectively.

Figure 5:
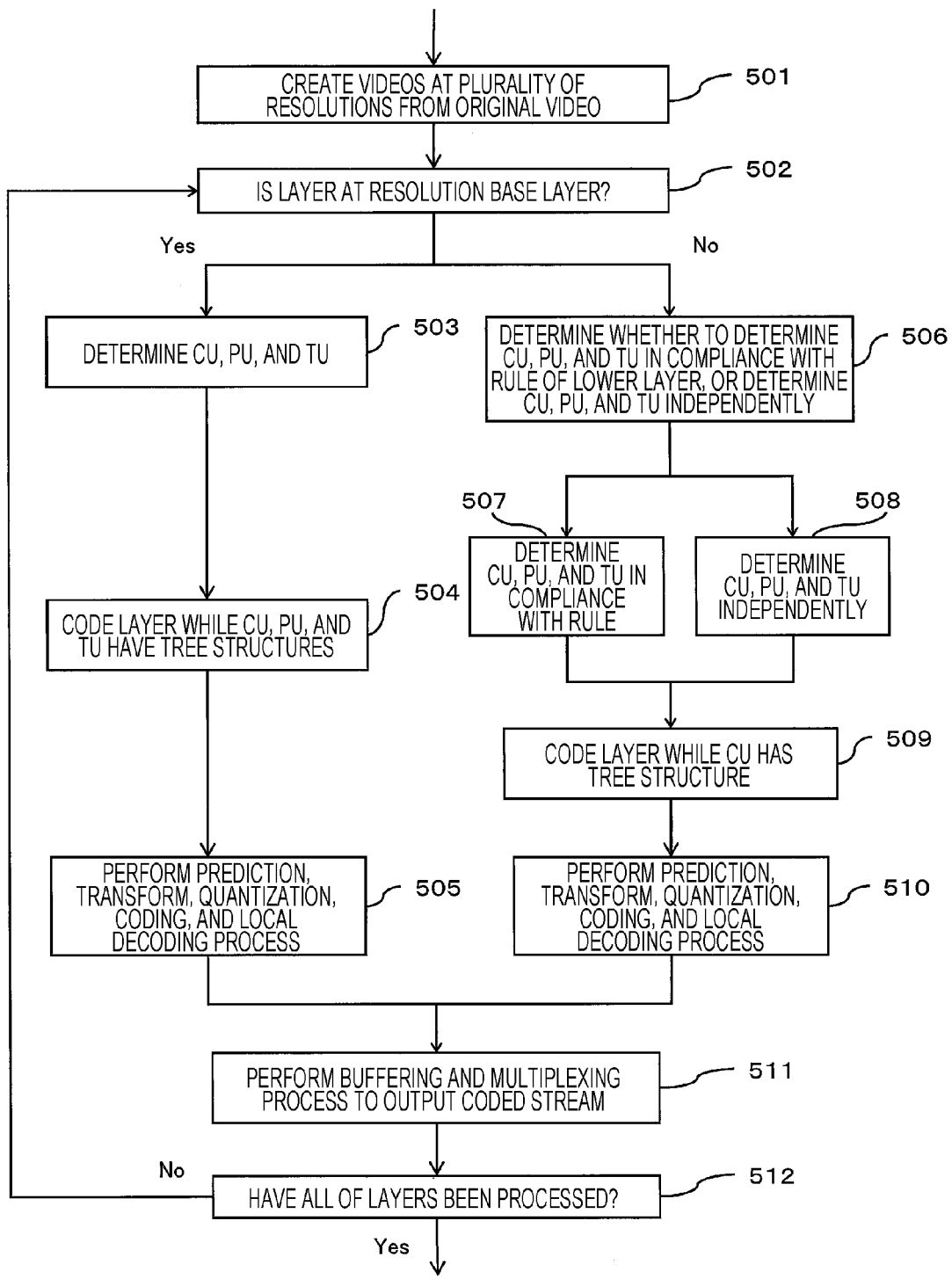
FIG. 5 is a flow chart of the video coding used in the image coding apparatus according to the embodiment 1.

Next, a flow for coding a video used in the image coding apparatus will be described using FIG. 5.

First, in step 501, images at a plurality of resolutions are created from an original video. The created images are coded as different layers, respectively. For example, when the images are coded at three resolutions, the layer of which resolution is the same as the resolution of the input video is the layer 2. The layer of which resolution is transformed in half vertically and horizontally is the layer 1. The layer of which resolution is transformed in one-quarter vertically and horizontally is the layer 0 and the layer 0 can be the base layer. The resolution-based transform can use a general sampling filter.

Next, each of the layers is coded. Hereinafter, the coding of the base layer and the enhancement layer using the "CU" of which size can be selected from a plurality of sizes as in HEVC will be described.

In step 502, it is determined whether the layer to be processed is the base layer. When the layer is the base layer, the process goes to step 503. When the layer is the other layer, the process goes to step 504.

In steps 503 to 505, the base layer is coded.

In step 503, the division methods of CU, PU, and TU are determined. The division method can be determined after the optimization for increasing the coding efficiency in whole the video as described above.

In step 504, the layer is coded while CU, PU, TU have a tree structure.

In step 505, a prediction, a transform, a quantization, an entropy coding, and a local decoding process are performed. They can be performed using existing coding methods.

In step 511, the data of the coded layer is buffered. After the other layers are coded, the layers are multiplexed in a packetization process. The multiplexed coded stream is output.

In step 512, it is determined whether all of the layers have been processed. When all of the layers have been processed, the process is terminated. When there is a layer that has not been coded, the process goes back to step 502 to process another layer.

In steps 506 to 510, the enhancement layer is coded.

In step 506, it is determined whether the division methods of CU, PU, and TU are determined in compliance with the rule of the lower layer, or determined independently. When the division methods are determined in compliance with the rule, the process goes to step 507. When the division methods are determined independently, the process goes to step 508.

In step 507, the division methods of CU, PU, and TU are determined in compliance with the rule with reference to the lower layer. The rule for the division method has been described above.

In step 508, the division methods of CU, PU, and TU are determined independently from the lower layer.

In step 509, the layer is coded while CU, PU, TU have a tree structure.

In step 510, a prediction, a transform, a quantization, an entropy coding, and a local decoding process are performed. They can be performed using existing coding methods.

Even after the enhancement layer is coded, the processes in steps 511 and 512 are similarly processed.

The video coding adapted to a plurality of resolutions is performed in the process described above.

Figure 6:
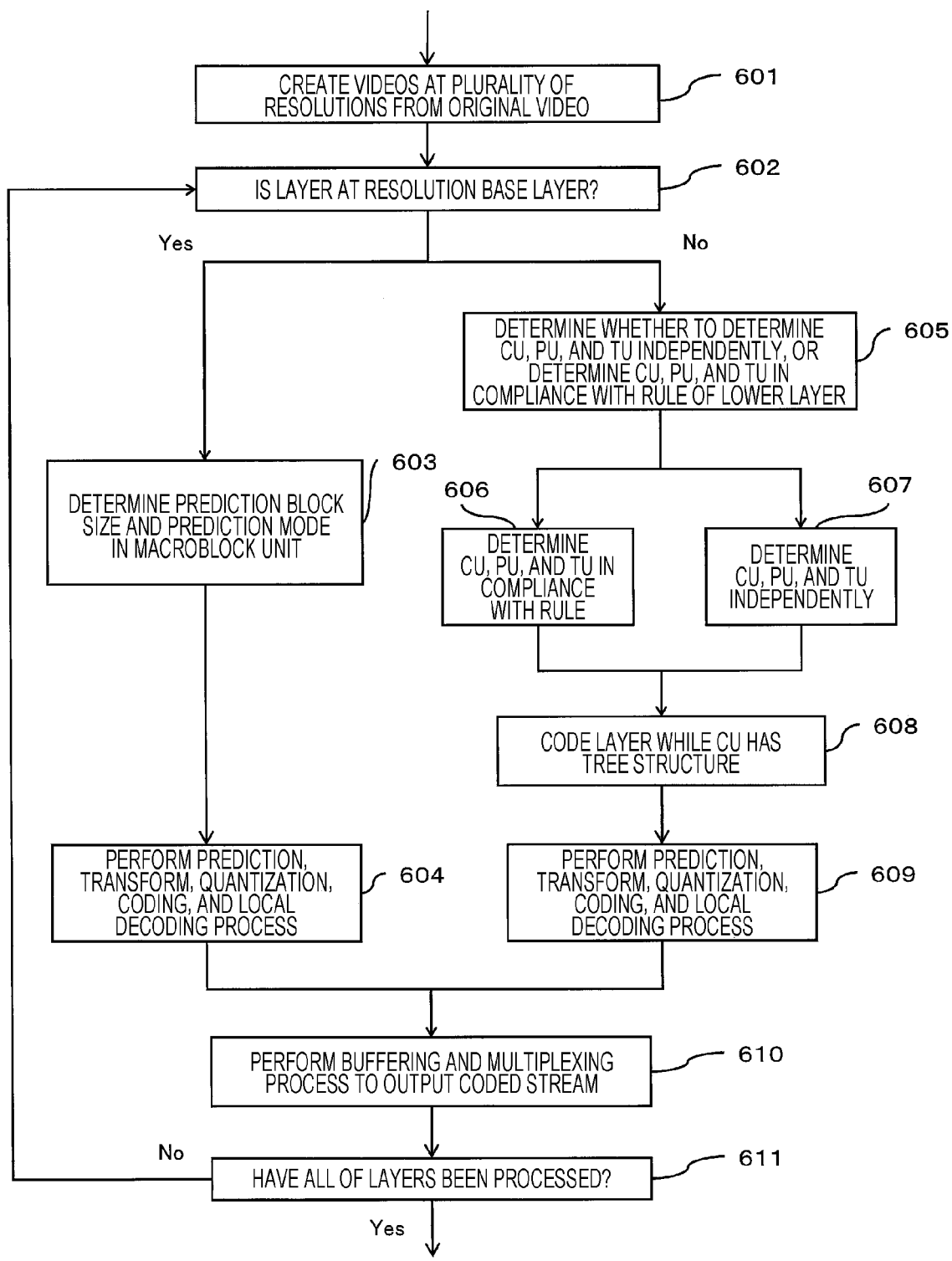
FIG. 6 is a flow chart of the video coding used in the image coding apparatus according to the embodiment 1.

Next, another flow for coding a video used in the image coding apparatus will be described using FIG. 6.

First, in step 601, images at a plurality of resolutions are created from an original video. The created images are coded as different layers, respectively. The resolution-based transform method has been described above.

Next, each of the layers is coded. Hereinafter, the base layer is coded using the macroblock with a fixed size of the coding unit as in H.264/AVC and MPEG-2, and the enhancement layer is coded using the "CU" of which size can be selected from a plurality of sizes as in HEVC.

In step 602, it is determined whether the layer to be processed is the base layer. When the layer is the base layer, the process goes to step 603. When the layer is the other layer, the process goes to step 604.

In steps 603 and 604, the base layer is coded.

In step 603, the prediction block size and prediction mode of each macroblock with a fixed size are determined to determine the coding mode. The method for determining the coding mode complies with an existing method. The coding mode can be determined after the optimization for increasing the coding efficiency in whole the video.

In step 604, a prediction, a transform, a quantization, an entropy coding, and a local decoding process are performed in compliance with the coding mode. They can be performed using existing coding methods.

In step 610, the data of the coded layer is buffered. After the other layers are coded, the layers are multiplexed in a packetization process. The multiplexed coded stream is output.

In step 611, it is determined whether all of the layers have been processed. When all of the layers have been processed, the process is terminated. When there is a layer that has not been coded, the process goes back to step 602 to process another layer.

In steps 605 to 609, the enhancement layer is coded.

In step 605, it is determined whether the division methods of CU, PU, and TU are determined in compliance with the rule of the lower layer, or determined independently. When the division methods are determined in compliance with the rule, the process goes to step 606. When the division methods are determined independently, the process goes to step 607.

In step 606, the division methods of CU, PU, and TU are determined in compliance with the rule with reference to the lower layer. The rule for the division method has been described above.

In step 607, the division methods of CU, PU, and TU are determined independently from the lower layer.

In step 608, the layer is coded while CU, PU, TU have a tree structure.

In step 609, a prediction, a transform, a quantization, an entropy coding, and a local decoding process are performed. They can be performed using existing coding methods.

Even after the enhancement layer is coded, the processes in steps 610 and 611 are similarly processed.

The video coding adapted to a plurality of resolutions is performed in the process described above.

The image coding apparatus and image coding method described above enables the description of CU, PU, and TU corresponding to a plurality of resolution layers and more efficient than the description in an existing coding system. The image coding apparatus and image coding method with a compression efficiency higher than that in an existing system.

Furthermore, the image coding apparatus and image coding method can be applied to a recording device, a mobile phone, a digital camera, or the like.

The image coding apparatus and image coding method described above can reduce the amount of code in coded data while preventing the degradation of the image quality of the video decoded from the coded data. In other words, a high compression ratio and a high image quality can be implemented.

Figure 2:
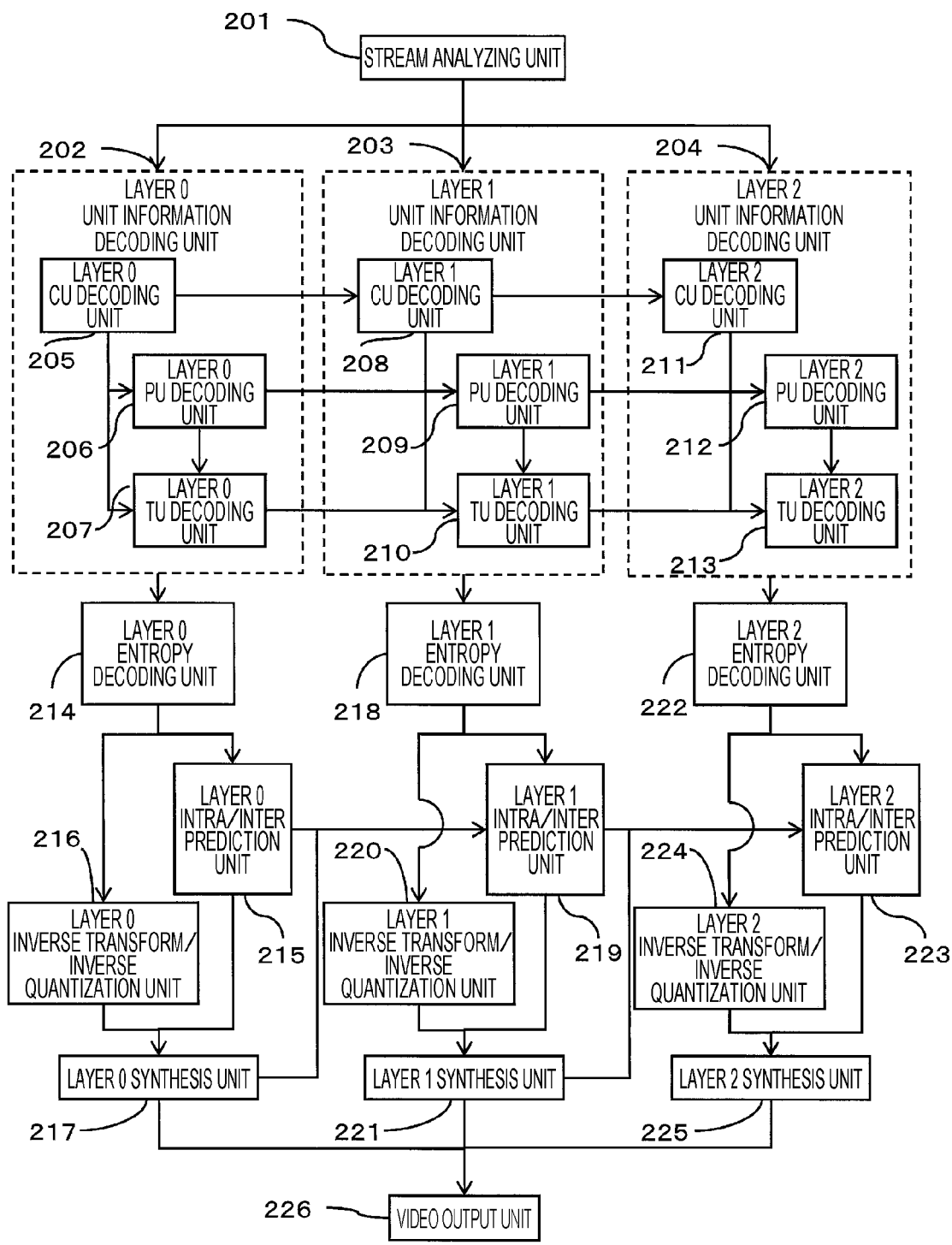
FIG. 2 is a block diagram of the image decoding apparatus according to the embodiment 1.

Next, an exemplary block diagram of an image decoding apparatus is illustrated in FIG. 2.

The image decoding apparatus in the present embodiment includes a stream analyzing unit 201, a layer 0 unit information decoding unit 202, a layer 1 unit information decoding unit 203, a layer 2 unit information decoding unit 204, a layer 0 CU decoding unit 205, a layer 0 PU decoding unit 206, a layer 0 TU decoding unit 207, a layer 1 CU decoding unit 208, a layer 1PU decoding unit 209, a layer 1 TU decoding unit 210, a layer 2 CU decoding unit 211, a layer 2 PU decoding unit 212, a layer 2 TU decoding unit 213, a layer 0 entropy decoding unit 214, a layer 0 intra/inter prediction unit 215, a layer 0 inverse transform/inverse quantization unit 216, a layer 0 synthesis unit 217, a layer 1 entropy decoding unit 218, a layer 1 intra/inter prediction unit 219, a layer 1 inverse transform/inverse quantization unit 220, a layer 1 synthesis unit 221, a layer 2 entropy decoding unit 222, a layer 2 intra/inter prediction unit 223, a layer 2 inverse transform/inverse quantization unit 224, a layer 2 synthesis unit 225, and the video output unit 226.

Hereinafter, the operation of each of the components in the image decoding apparatus will be described in detail. Note that the operation of each of the components in the image decoding apparatus can be, for example, an autonomous operation of each of the components as to be described below. Alternatively, the operation can be implemented by the cooperation of the control unit of the computer or the software stored in the storage unit of the computer.

First, the stream analyzing unit 201 analyzes the input coded stream. At that time, the stream analyzing unit 201 also extracts data from the packet and obtains the information about various headers and flags.

The coded stream input to the stream analyzing unit 201 at that time is the coded stream generated with the image coding apparatus and image coding method according to the embodiment 1. The generation method is the same as described in the embodiment 1. Thus, the description will be omitted. The coded stream can be a coded stream read from a data recording medium to be described below. The recording method will be described below.

The stream analyzing unit separates the coded data of each layer. First, the data of the base layer is decoded, and then the upper layers are sequentially decoded. Hereinafter, an example in which the layer 0, the layer 1, and the layer 2 are decoded in ascending order.

First, the layer 0 that is the base layer is decoded. As described above, the coding system of the base layer includes a system in which the layer is coded using the macroblock with a fixed size of the coding unit as in H.264/AVC or MPEG-2, and a system in which the layer is coded using CU of which size can be selected from a plurality of sizes as in HEVC. Hereinafter, when the macroblock is used, CU can be replaced by the macroblock PU can be replaced by the prediction block determined in the macroblock.

The layer 0 unit information decoding unit 202 decodes CU, TU, and PU of the layer 0.

The layer 0 CU decoding unit 205 decodes CU of the layer 0. In that case, CU of the layer 0 can be decoded according the CU coding method described above and in a corresponding decoding method.

The layer 0 PU decoding unit 206 decodes PU of the layer 0. In that case, PU of the layer 0 can be decoded in a decoding method corresponding to the PU coding method described above with reference to the information about CU decoded with the layer 0 CU decoding unit 205.

The layer 0 TU decoding unit 207 decodes TU of the layer 0. In that case, TU of the layer 0 can be decoded with a decoding method corresponding to the TU coding method described above with reference to the information about CU decoded with the layer 0 CU decoding unit 205.

The layer 0 is decoded based on the unit information about the layer 0.

The layer 0 entropy decoding unit 214 decodes the coding mode information, flag information, and residual coefficient that have been entropy-coded.

The layer 0 intra/inter prediction unit 215 performs an intra prediction or an inter prediction according to the CU division method, PU division method, and prediction modes in the unit information. Existing methods are used as the prediction methods.

The layer 0 inverse transform/inverse quantization unit 216 performs an inverse quantization and an inverse frequency transform according to the CU division method and TU division method in the unit information. Existing methods are used as the processing methods.

The layer 0 synthesis unit 217 synthesizes the prediction pixels created with the layer 0 intra/inter prediction unit 215, and the residual elements created with the layer 0 inverse transform/inverse quantization unit 216 to create a decoded video. The decoded video is transmitted to the video output unit 226.

Next, the layer 1 that is the next upper layer is decoded.

The layer 1 unit information decoding unit 203 decodes CU, TU, and PU of the layer 1.

The layer 1 CU decoding unit 208 decodes CU of the layer 1 with reference to CU of the layer 0 that is the lower layer. The process for decoding CU of the layer 1 and the rule for referring to the layer 0 have been described above.

The layer 1 PU decoding unit 209 decodes PU of the layer. The layer 1 PU decoding unit 209 decodes PU of the layer 1 in a decoding process corresponding to the PU coding process described above with reference to the information about PU of the layer 0 that is the lower layer and about CU decoded with the layer 1 CU decoding unit 208.

The layer 1 TU decoding unit 210 decodes TU of the layer 1. The layer 1 TU decoding unit 210 decodes TU of the layer 1 in a decoding process corresponding to the TU coding process described above with reference to the information about TU of the layer 0 that is the lower layer and about CU decoded with the layer 1 CU decoding unit 208.

Next, the layer 1 is decoded based on the unit information about the layer 1.

The layer 1 entropy decoding unit 218 decodes the coding mode information, flag information, and residual coefficient that have been entropy-coded.

The layer 1 intra/inter prediction unit 219 performs an intra prediction or an inter prediction according to the CU division method, PU division method, and prediction mode in the unit information. Existing methods are used as the prediction methods.

The layer 1 inverse transform/inverse quantization unit 220 performs an inverse quantization and an inverse frequency transform according to the CU division method and TU division method in the unit information. Existing methods can be used as the processing methods.

The layer 1 synthesis unit 221 synthesizes the prediction pixels created with the layer 1 intra/inter prediction unit 219 and residual elements created with the layer 1 inverse transform/inverse quantization unit 220 to create a decoded video. The decoded video is transmitted to the video output unit 226.

Next, the layer 2 that is the next upper to the next upper layer is decoded.

The layer 2 unit information decoding unit 204 decodes CU, TU, and PU of the layer 2.

The layer 2 CU decoding unit 211 decodes CU of the layer 2 with reference to CU of the layer 1 that is the lower layer. The process for decoding CU of the layer 2 and the rule for referring to the layer 1 have been described above.

The layer 2 PU decoding unit 212 decodes PU of the layer 2. The layer 2 PU decoding unit 212 decodes PU of the layer 2 in a decoding process corresponding to the PU coding process described above with reference to the information about PU of the layer 1 that is the lower layer and about CU decoded with the layer 2 CU decoding unit 211.

The layer 2 TU decoding unit 213 decodes TU of the layer 2. The layer 2 TU decoding unit 213 decodes TU of the layer 2 in a decoding process corresponding to the TU coding process described above with reference to the information about TU of the layer 1 that is the lower layer and about CU decoded with the layer 2 CU decoding unit 211.

Next, the layer 2 is decoded based on the unit information about the layer 2.

The layer 2 entropy decoding unit 222 decodes the coding mode information, flag information, and residual coefficient that have been entropy-coded.

The layer 2 intra/inter prediction unit 223 performs an intra prediction or an inter prediction according to the CU division method, PU division method, and prediction mode in the unit information. Existing methods are used as the prediction methods.

The layer 2 inverse transform/inverse quantization unit 224 performs an inverse quantization and an inverse frequency transform according to the CU division method and TU division method in the unit information. Existing methods are used as the processing methods.

The layer 2 synthesis unit 225 synthesizes the prediction pixels created with the layer 2 intra/inter prediction unit 223 and residual elements created with the layer 2 inverse transform/inverse quantization unit 224 to create a decoded video. The decoded video is transmitted to the video output unit 226.

In the method as descried above, a video is decoded from the video-coded stream corresponding to a plurality of resolutions.

Figure 7:
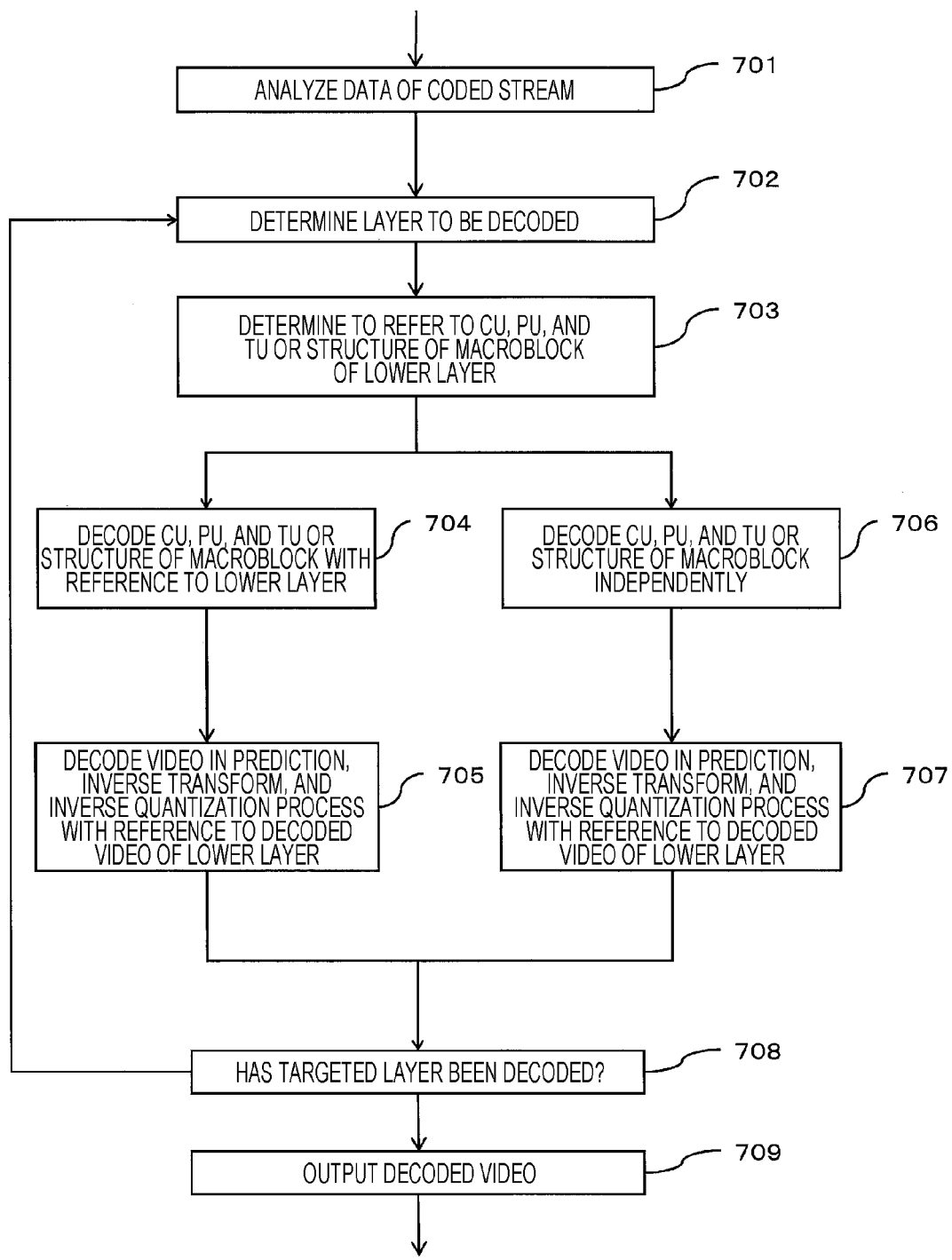
FIG. 7 is a flow chart of an image decoding method according to the embodiment 1.

Next, the flow of the image decoding method in the image decoding apparatus according to the embodiment 1 will be described using FIG. 7.

First, in step 701, the coded stream to be decoded is obtained. The coded stream includes the coded images at a plurality of resolutions. Thus, partially extracting a stream can decode the image at the designated resolution.

In step 702, the layer to be decoded is determined. To decode the layer to be decoded, the images from the base layer to the layer to be decoded are sequentially decoded. Hereinafter, it is assumed in the description that the layers are sequentially decoded. The description includes both of the cases in which the base layer is coded using the macroblock with a fixed size of the coding unit as in H.264/AVC and MPEG-2, and in which the base layer is coded using CU that is a coding unit of which size can be selected from a plurality of sizes as in HEVC. The case in which the enhancement layer is coded using CU with various sizes of the coding unit as in HEVC will be described.

In step 703, it is determined whether to refer to the structures of CU, PU, and TU, or the macroblock and prediction block size of the lower layer. The base layer does not refer to them because the layer is the bottom layer. When the lower layer is referred to, the process goes to step 704. When the lower layer is not referred to, the process goes to step 706.

In step 704, the structures of CU, PU, and TU, or the macroblock and prediction block size are decoded with reference to the lower layer. The rule for referring to the lower layer has been described above.

In step 705, a prediction, an inverse quantization, and an inverse frequency transform are performed to decode the layer using the information about the structures of CU, PU, and TU, or the macroblock and prediction block size that have been decoded in step 704 with reference to the decoded image of the lower layer.

In step 706, the structures of CU, PU, and TU, or the macroblock and prediction block size are independently decoded on the layer.

In step 707, a prediction, an inverse quantization, and an inverse frequency transform are performed to decode the layer using the information about the structures of CU, PU, and TU, or the macroblock and prediction block size that have been decoded in step 706 with reference to the decoded image of the lower layer.

In step 708, it is determined whether the targeted layer has been decoded. When the targeted layer has been decoded, the process goes to step 709. When the targeted layer has not been decoded, the process goes to step 702 to decode the further upper layer.

In step 709, the decoded video is output.

In the method as descried above, a video is decoded from the video-coded stream corresponding to a plurality of resolutions.

The image decoding apparatus and image decoding method described above enable the more efficient description of CU, PU, and TU corresponding to the layers at a plurality of resolutions than existing coding methods. An image decoding apparatus and image decoding method with a compression efficiency higher than existing systems can be implemented.

Furthermore, the image decoding apparatus and image decoding method can be applied to a picture reproducer, a mobile phone, a digital camera, or the like.

The image decoding apparatus and image decoding method described above can decode coded data with a small amount of code as a video with a high quality.

Figure 8:
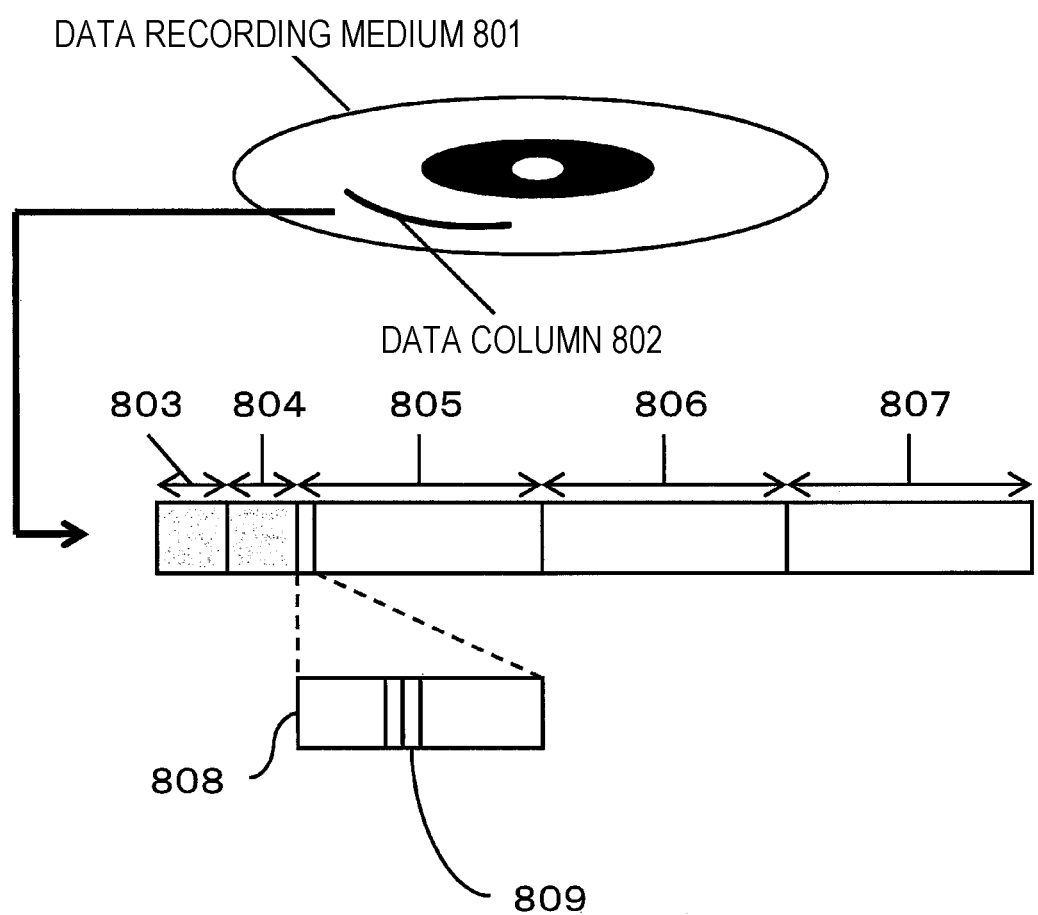
FIG. 8 is an explanatory diagram of a data recording medium according to the embodiment 1.

Next, FIG. 8 illustrates a data recording medium storing the coded stream generated with the image coding apparatus or image coding method described above. The stored coded stream is generated with the image coding apparatus or image coding method described above. The generation method has been described above. Thus, the description will be omitted. In that case, the coded stream is recorded as a data column 802 in a data recording medium 801. The data column 802 is recorded as a coded stream in compliance with a predetermined grammar. Hereinafter, a partially-changed HEVC will be described.

In the HEVC, a sequence parameter set 803, a picture parameter set 804, and slices 805, 806, and 807 are included in the stream. Hereinafter, the case in which a slice stores an image (picture) will be described.

Information 808 about each of CU, PU, and TU is included in each of the slices. The information 808 about each of CU, PU, and TU includes a region configured to record the prediction method and transform method of each of CU, PU, and TU. The regions are coding mode flags 809.

The data recording medium described above records the coded stream with a compression efficiency higher than existing systems and thus can record a lot of videos.

REFERENCE SIGNS LIST 101 resolution transform unit
102 layer 0 unit information calculating unit
103 layer 1 unit information calculating unit
104 layer 2 unit information calculating unit
105 layer 0 CU calculating unit
106 layer 0 PU calculating unit
107 layer 0 TU calculating unit
108 layer 1 CU calculating unit
109 layer 1 PU calculating unit
110 layer 1 TU calculating unit
111 layer 2 CU calculating unit
112 layer 2 PU calculating unit
113 layer 2 TU calculating unit
114 layer 0 intra/inter prediction unit
115 layer 0 transform/quantization unit
116 layer 0 coding process unit
117 layer 1 intra/inter prediction unit
118 layer 1 transform/quantization unit
119 layer 1 coding process unit
120 layer 2 intra/inter prediction unit
121 layer 2 transform/quantization unit
122 layer 2 coding process unit
123 multiplexer
124 data output unit
201 stream analyzing unit
202 layer 0 unit information decoding unit
203 layer 1 unit information decoding unit
204 layer 2 unit information decoding unit
205 layer 0 CU decoding unit
206 layer 0 PU decoding unit
207 layer 0 TU decoding unit
208 layer 1 CU decoding unit
209 layer 1 PU decoding unit
210 layer 1 TU decoding unit
211 layer 2 CU decoding unit
212 layer 2 PU decoding unit
213 layer 2 TU decoding unit
214 layer 0 entropy decoding unit
215 layer 0 intra/inter prediction unit
216 layer 0 inverse transform/inverse quantization unit
217 layer 0 synthesis unit
218 layer 1 entropy decoding unit
219 layer 1 intra/inter prediction unit
220 layer 1 inverse transform/inverse quantization unit
221 layer 1 synthesis unit
222 layer 2 entropy decoding unit
223 layer 2 intra/inter prediction unit
224 layer 2 inverse transform/inverse quantization unit
225 layer 2 synthesis unit
226 video output unit

The invention claimed is:

1. An image decoding method for decoding a coded stream obtained by coding a video and capable of decoding images at a plurality of resolutions by extracting a part of the coded stream, the method comprising:
  decoding a division method of a unit CU for coding each layer;
  decoding a division method of a prediction unit PU; and
  decoding a division method of a frequency transform unit TU,
  wherein, in the decoding of CU of a layer 1, the CU division method is calculated with reference to a CU division method of another layer 0 and in compliance with a given rule,
  in the decoding of PU of a layer 1, the PU division method is calculated with reference to a CU division method of the same layer 1 and a PU division method of another layer 0, and in compliance with a given rule,
  in the decoding of TU of a layer 1, the TU division method is calculated with reference to a CU division method of the same layer 1 and a TU division method of another layer 0, and in compliance with a given rule, and the given rule is determined with a flag.

2. The image decoding method according to claim 1, wherein a base layer is decoded in a decoding system in which a macroblock with a fixed size of a decoding unit is used, and an enhancement layer is decoded in a decoding system in which CU that is a coding unit of which size is capable of being selected from a plurality of sizes is used.

3. The image decoding method according to claim 1, wherein the given rule is a rule in which sizes of CU, TU, and PU of a lower layer are set at sizes obtained by enlarging sizes of CU, TU, and PU at corresponding positions on an upper layer according to a resolution ratio, and places of which sizes exceed maximum sizes of CU, TU, and PU are set at the maximum sizes.

4. The image decoding method according to claim 1, wherein the given rule is a rule in which sizes of CU, TU, and PU of a lower layer are set at the same sizes as CU, TU, and PU of the upper layer with reference to CU, TU, and PU at corresponding positions on an upper layer according to a resolution ratio.

5. The image decoding method according to claim 1, wherein available sizes of CU, PU, and TU and available coding modes are previously designated for each layer and the sizes and modes are switched with a flag.

6. An image decoding apparatus that decodes a coded stream obtained by coding a video and is capable of decoding images at a plurality of resolutions by extracting a part of the coded stream, the apparatus comprising:

a CU decoding unit configured to decode a division method of a unit CU for coding each layer;

a PU decoding unit configured to decode a division method of a prediction unit PU; and a TU decoding unit configured to decode a division method of a frequency transform unit TU, wherein, the CU decoding unit of a layer 1 calculates the CU division method with reference to a CU division method output with a CU decoding unit of another layer 0 and in compliance with a given rule, the PU decoding unit of a layer 1 calculates the PU division method with reference to a CU division method of the same layer 1 and a PU division method output with a PU decoding unit of another layer 0, and in compliance with a given rule, the TU decoding unit of a layer 1 calculates the TU division method with reference to a CU division method of the same layer 1 and a TU division method output with a TU decoding unit of another layer 0, and in compliance with a given rule, and the given rule is determined with a flag.

7. The image decoding apparatus according to claim 6, wherein a base layer is coded in a coding system in which a macroblock with a fixed size of a coding unit is used, and an enhancement layer is coded in a coding system in which CU that is a coding unit with a different size is used.

8. The image decoding apparatus according to claim 6, wherein the given rule is a rule in which sizes of CU, TU, and PU of a lower layer are set at sizes obtained by enlarging sizes of CU, TU, and PU at corresponding positions on an upper layer according to a resolution ratio, and places of which sizes exceed maximum sizes of CU, TU, and PU are set at the maximum sizes.

9. The image decoding apparatus according to claim 6, wherein the given rule is a rule in which sizes of CU, TU, and PU of a lower layer are set at the same sizes as CU, TU, and PU of the upper layer with reference to CU, TU, and PU at corresponding positions on an upper layer according to a resolution ratio.

10. The image decoding apparatus according to claim 6, wherein available sizes of CU, PU, and TU and available coding modes are previously designated for each layer and the sizes and modes are switched with a flag.

* * * * *